US012607007B2

(12) United States Patent
Keene

(10) Patent No.: US 12,607,007 B2
(45) Date of Patent: Apr. 21, 2026

(54) DRAINABLE HOUSE WRAP

(71) Applicant: Keene Building Products Co., Inc.,
Cleveland, OH (US)

(72) Inventor: James R. Keene, Miami Beach, FL
(US)

(73) Assignee: Keene Building Products Co., Inc.,
Cleveland, OH (US)

( * ) Notice: Subject to any disclaimer, the term of this
patent is extended or adjusted under 35
U.S.C. 154(b) by 363 days.

(21) Appl. No.: 17/863,986

(22) Filed: Jul. 13, 2022

(65) Prior Publication Data

US 2023/0016308 A1 Jan. 19, 2023

Related U.S. Application Data

(60) Provisional application No. 63/221,902, filed on Jul.
14, 2021.

(51) Int. Cl.
| | |
|---|---|
| *E04B 1/62* | (2006.01) |
| *B29C 70/22* | (2006.01) |
| *B29C 70/50* | (2006.01) |
| *E04B 1/70* | (2006.01) |
| *B29K 105/10* | (2006.01) |
| *B29K 223/00* | (2006.01) |
| *B29L 31/10* | (2006.01) |

(52) U.S. Cl.
CPC .............. *E04B 1/625* (2013.01); *B29C 70/22*
(2013.01); *B29C 70/504* (2013.01); *E04B*
*1/7038* (2013.01); *B29K 2105/107* (2013.01);
*B29K 2223/06* (2013.01); *B29K 2995/0097*
(2013.01); *B29L 2031/10* (2013.01)

(58) Field of Classification Search
CPC .......... E04B 1/625; E04B 1/62; E04B 1/7038;
B29C 70/22; B29C 70/222; B29C 70/24;
B29K 2105/107
See application file for complete search history.

(56) References Cited

U.S. PATENT DOCUMENTS

| | | | | |
|---|---|---|---|---|
| 6,715,249 B2 * | 4/2004 | Rusek | ..................... | E04C 2/246 |
| | | | | 428/317.1 |
| 6,786,013 B2 * | 9/2004 | Coulton | ................ | E04D 12/002 |
| | | | | 52/302.3 |
| 6,804,922 B1 * | 10/2004 | Egan | ......................... | E04B 1/66 |
| | | | | 52/746.1 |
| 7,607,270 B2 * | 10/2009 | Ehrman | .................... | E04B 1/70 |
| | | | | 52/302.1 |
| 7,625,827 B2 * | 12/2009 | Egan | ....................... | E04F 13/04 |
| | | | | 52/408 |
| 8,647,734 B2 * | 2/2014 | Keene | ....................... | B32B 5/26 |
| | | | | 428/218 |
| 9,145,688 B2 * | 9/2015 | Hunt-Hansen | ...... | E04F 13/0803 |

(Continued)

FOREIGN PATENT DOCUMENTS

| | | | | |
|---|---|---|---|---|
| KR | 100939726 B1 * | 1/2010 | ............. | B32B 15/20 |
| WO | WO-02066242 A1 * | 8/2002 | ........... | D03D 15/283 |

*Primary Examiner* — Ryan D Kwiecinski

(74) *Attorney, Agent, or Firm* — Renner, Otto, Boisselle
& Sklar, LLP

(57) ABSTRACT

A drainable house wrap and method of making same
includes a flexible weather-resistant sheet layer, and a plu-
rality of raised spacers coupled to the sheet layer, wherein
each spacer comprises at least a first strand overlapping a
second strand, and wherein the plurality of raised spacers
form at least one drainage path for the drainable house wrap.

18 Claims, 6 Drawing Sheets

(56)        References Cited

U.S. PATENT DOCUMENTS

| 10,596,746 | B1 * | 3/2020 | Paradies | ................. B29C 51/46 |
| 2002/0146953 | A1 * | 10/2002 | Lubker, II | ................. B32B 5/12 |
| | | | | 442/187 |
| 2003/0022578 | A1 * | 1/2003 | Lubker, II | ............... B32B 27/34 |
| | | | | 428/141 |
| 2004/0229012 | A1 * | 11/2004 | Lubker, II | ................. B32B 5/08 |
| | | | | 52/302.1 |
| 2006/0194494 | A1 * | 8/2006 | Lubker, II | ............... B32B 29/02 |
| | | | | 52/302.1 |
| 2007/0144110 | A1 * | 6/2007 | Aalbers | .................. B32B 27/32 |
| | | | | 52/782.1 |
| 2014/0272404 | A1 * | 9/2014 | Shake | .................... B32B 17/06 |
| | | | | 428/221 |
| 2015/0361653 | A1 * | 12/2015 | Grant | ..................... E04B 1/625 |
| | | | | 52/406.1 |
| 2016/0215497 | A1 * | 7/2016 | Fritz | ......................... E04B 2/28 |
| 2017/0198470 | A1 * | 7/2017 | Hickie | ................... B32B 27/08 |
| 2018/0066427 | A1 * | 3/2018 | Snyder | ..................... B32B 5/26 |
| 2021/0388606 | A1 * | 12/2021 | Ehrman | ................. B32B 27/34 |

* cited by examiner

DRAINABLE HOUSE WRAP

This application claims the benefit of U.S. Provisional Patent Application No. 63/221,902, filed Jul. 14, 2021, which is hereby incorporated herein by reference in its entirety.

TECHNICAL FIELD

The present disclosure relates generally to a house wrap or building envelope, and more particularly to a drainable house wrap.

BACKGROUND

A typical building includes a frame structure, a sheathing covering the frame structure, and a cladding forming the exterior of the building. Many conventional buildings also utilize house wraps, also referred to as building envelopes, which functions as a weather-resistant barrier that is placed between the cladding and sheathing. The house wrap is made of an engineered material that prevents exterior moisture from entering through the sheathing, while also allowing water vapor to pass to the exterior environment.

SUMMARY

At least one problem that generally persists with conventional house wraps is the limited water drainage functionality of these designs.

At least one aspect of the present disclosure provides improvements in the drainage control of house wraps by providing raised spacer elements formed by overlapping strands coupled to the flexible weather-resistant sheet to thereby form one or more drainage paths for the house wrap.

At least one other problem associated with convention house wraps is the limited airflow functionality of these designs.

Another aspect of the present disclosure forms airflow channels across the raised spacer elements to thereby provide a direction of airflow that is crosswise to the direction of drainage flow.

In exemplary embodiments, the airflow channels may be formed by compressed regions of the overlapping strands, which these compressed regions may be formed by thermal compression to thereby form bonding regions to the weather-resistant sheet.

According to an aspect, a drainable house wrap includes: a flexible weather-resistant sheet layer, and a plurality of raised spacers coupled to the sheet layer, wherein each spacer comprises at least a first strand overlapping a second strand, and wherein the raised spacers form at least one drainage path for the drainable house wrap.

According to another aspect, a method of forming a drainable house wrap includes: depositing a first strand, depositing a second strand overlapping the first strand, coupling the first and second strands to a weather-resistant flexible sheet to form spacers on the sheet, wherein regions between the spacers form drainage flow regions of the drainable house wrap.

According to another aspect, a drainable house wrap and method includes a plurality of vertically extending extruded strands coupled to a weather-resistant sheet, and compressed regions of the extruded strands forming airflow channels in a direction transverse to the strands.

The following description and the annexed drawings set forth certain illustrative embodiments of the invention.

These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
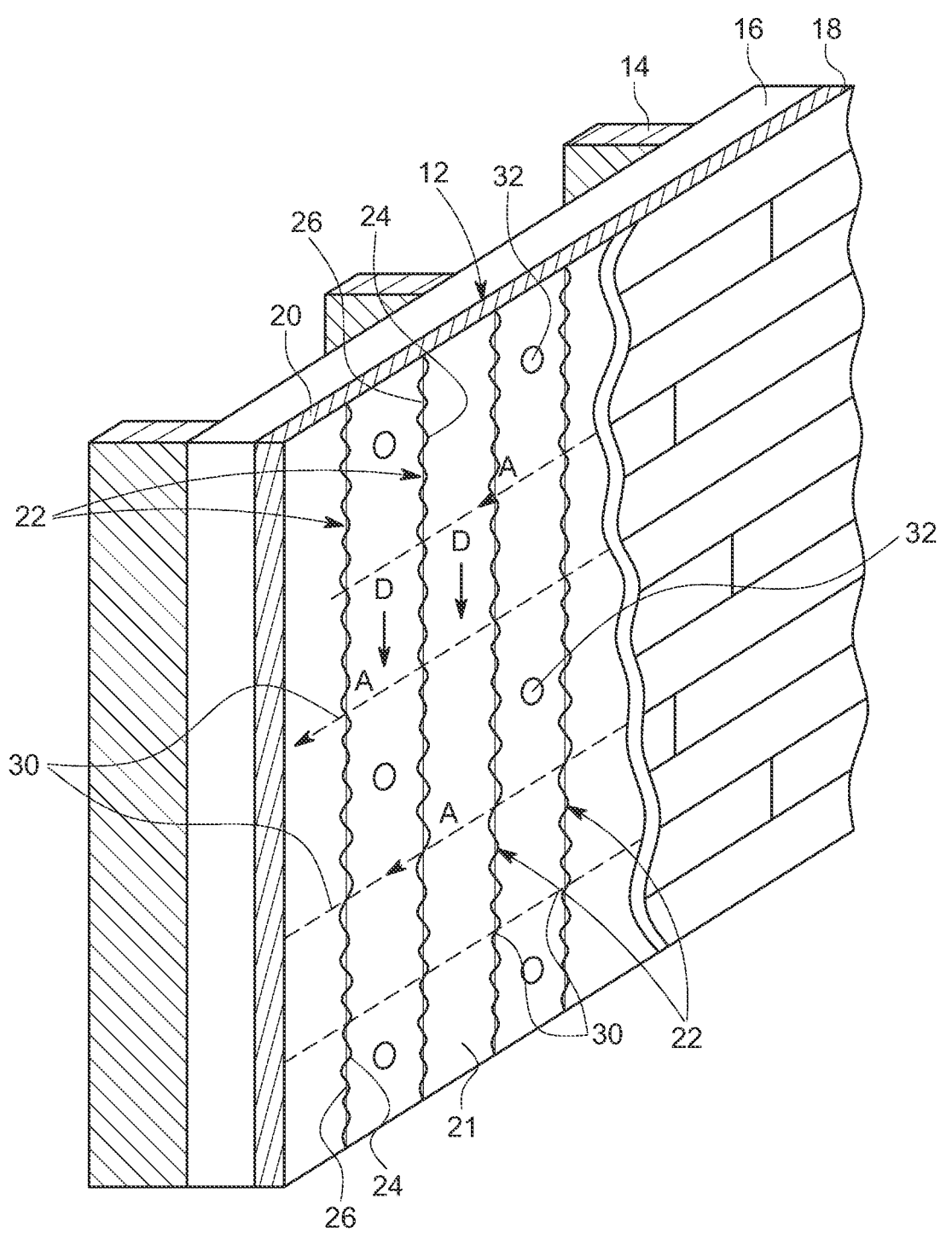
FIG. 1 is a perspective view of an exemplary drainable house wrap according to an embodiment of the present disclosure installed on a building.

The principles and aspects according to the present disclosure have particular application to house wraps, also commonly referred to as building wraps or building envelopes, and thus will be described below chiefly in this context. It is understood, however, that the principles and aspects according to the present disclosure may be applicable for other uses where a weather-resistant sheet having improved drainage and/or airflow control is a desirable attribute.

Referring to FIGS. 1 and 4-7, an exemplary drainable house wrap 12 according to an embodiment of the present disclosure is shown. In the illustrated embodiment, the house wrap 12 is installed on a building including a frame structure 14, a sheathing 16, and cladding 18. In exemplary embodiments, the house wrap 12 is installed between the sheathing 16 and the cladding 18. The frame structure 14 may include studs, such as wooden or metal studs. The sheathing 16 may include wood paneling, such as oriented strand board (OSB) or the like. The cladding 18 may have an ornamental look and may include one or more types of materials, including vinyl siding, stone, or the like.

As shown, the house wrap 12 generally includes a flexible weather-resistant sheet layer 20, and a plurality of raised spacers 22 coupled to at least one side 21 of the sheet layer 20. The spacers 22 each include at least a first strand 24 overlapping a second strand 26, in which the spacers 22 are configured to abut the cladding 18 (or other layer) to form a gap between the front major surface 21 (frontside) of the sheet layer 20 and the cladding 18 to thereby provide at least one drainage path for the drainable house wrap 12.

The weather-resistant sheet layer 20 may be any suitable layer (or combination of layers) made of any suitable material(s) and that is engineered to allow water vapor to permeate the layer 20 while preventing water or other liquids from entering the layer 20. The weather-resistant layer may be a 100% synthetic material which is sufficiently flexible to be rolled and installed on the building structure. In exemplary embodiments, the weather-resistant sheet 20 includes at least one layer made with high-density polyethylene fibers, which may be randomly-oriented spunbound (non-woven) fibers without a binder, which results in tiny perforations in the layer structure that enables water vapor to pass thereacross but which prevents liquid water from breaking the surface. The vapor permeability of the layer 20 may be in a range from about 1 to 100 perms, for example. The thickness of the layer 20 may be in a range from about 5-15 mil (0.125-0.4 mm). Non-limiting examples of such a weather-resistant sheet may be those described in U.S. Pat. Nos. 3,169,899; 4,929,303; etc., the entire contents of which are incorporated herein by reference in their entireties.

The raised spacers 22 coupled to the weather-resistant sheet 20 include at least the first and second overlapping strands 24, 26 which increase the thickness of the house wrap 12 at those regions and enable the spacing between the frontside 21 of the sheet 20 and the cladding 18 which forms the drainage flow path(s). As shown, each spacer 22 may be formed as a band or segment that extends vertically along a length of the sheet 20. The respective bands of spacers 22 are laterally spaced apart which forms vertical drainage flow gaps in these regions between the spacers 22 (as shown with direction drainage flow arrow, D). In exemplary embodiments, the respective spacers 22 extend in vertically spaced apart segments (with transverse airflow channels 30 therebetween) along an entire length of the sheet 20. It is understood, however, that the bands or segments of spacers 22 could be longer, shorter, discontinuous, or could be oriented in other directions, including slanted or horizontal directions, as may be desired for particular applications.

The overlapping strands 24, 26 forming the spacers 22 may be made of any suitable material or combination of materials that have sufficient strength to maintain a drainage flow gap between the frontside 21 of the sheet 20 and the cladding 18 while also being compatible for exposure to water vapor or liquid water. The overlapping strands 24, 26 also may provide desired properties of flexibility and resiliency, which enables the house wrap 12 to be deformed (e.g., folded, bent or rolled). The strands 24, 26 may be formed by monofilaments, which may be made of thermoplastic material. For example, some or all of the strands 24, 26 may be formed by one or more of polyolefin (e.g., polyethylene, polypropylene, etc.), polyamide (e.g., Nylon), polyester, polyvinylhalide (e.g., polyvinylchloride (PVC), polyvinylidene chloride, polyvinyltetrafluoride, or polyvinylchlorotrifluoride), polystyrene, polyvinylester (e.g., polyvinyl acetate, etc.), or a mixture of two or more thereof.

The first strand 24 and/or the second strand 26 may be of any length, and each preferably extends continuously with the other to form the entirety of each spacer segment. In exemplary embodiments, one or both of the individual strands 24, 26 may have an average diameter in a range from about 0.125 millimeters (mm) to about 5.0 mm, more particularly from about 0.125 mm to about 2 mm, such as about 0.125 mm, 0.25 mm, 0.5 mm, 0.75 mm, 1.0 mm, 1.5 mm, 2.0 mm, 2.5 mm, 3.0 mm, 3.5 mm, 4.0 mm, 4.5 mm, or 5.0 mm, including all ranges and subranges between the stated values.

In exemplary embodiments, the second strand 26 extends in a linear vertical path along the weather-resistant sheet 20, and the first strand 24 laterally overlaps the second strand 26 in a back-and-forth manner as the first strand 24 traverses vertically along the sheet 20 and second strand 26, as illustrated. This forms a general zig-zag or sinusoidal like pattern of the first strand 24 as it overlaps the second strand 26, although a uniform or exact such pattern is not required. In exemplary embodiments, only one strand (e.g., the first strand 24) is on top and overlaps the other strand (e.g., second strand 26) which simplifies the manufacturing of the spacers 22. In exemplary embodiments, during formation of the overlapping strands 24, 26, the strands 24, 26 are self-bonded or fused to each other at their overlapping points of intersection without a bonding agent, as will be described in further detail below.

Generally, assuming each strand 24, 26 is the same thickness and is overlapped at each region only once, then the thickness of the spacer 22 at that region will be twice the diameter of the strand. The overlapping of the strands 24, 26 may occur more than once, however, in which case the thickness of the spacer 22 would be a corresponding multiple of the strand diameter. In exemplary embodiments, the overlapping of the first strand 24 with the second strand 26 may form an overall thickness of the respective spacers 22 in a range from about 0.25 millimeters (mm) to about 10 mm, more particularly from about 0.25 mm to about 2.0 mm, such as about 0.25 mm, 0.5 mm, 0.75 mm, 1.0 mm, 1.5 mm, 2.0 mm, 2.5 mm, 3.0 mm, 3.5 mm, 4.0 mm, 4.5 mm, or 5.0 mm, etc. including all ranges and subranges between the stated values.

As noted above, vertical segments of the spacers 22 may be spaced apart by transverse airflow gaps or channels 30. These airflow channels 30 extend across the spacers 22 and enable airflow communication between the respective drainage flow channels formed between laterally spaced apart pairs of spacers 22. Such airflow channels 30 enable a direction of airflow (A) that is crosswise to the direction of drainage flow (D), which may enhance evaporation of liquid water between the house wrap 12 and cladding 18. In exemplary embodiments, the airflow channels 30 may be formed by compressed regions of the overlapping strands 24, 26. These compressed regions may be formed by thermal compression such that the regions forming the airflow channels 30 also form bonding regions of the strands 24, 26 (and spacers 22) to the weather-resistant sheet 20. It is of course understood that the spacers 22 could be coupled to the weather-resistant sheet 20 by any other suitable manner, including adhesion with a bonding agent or via fasteners if desired.

Still referring to FIG. 1, the house wrap 12 may be attached to the sheathing 14 in any suitable manner, such as via fasteners 32 as is conventional. In exemplary embodiments, the house wrap 12 may be formed to have suitable spacing between spacers 22 to provide sufficient space for the fasteners 32. The house wrap 12 could be formed with identifiers, such as regions or structures between spacers 22, to identify locations for the fasteners 32.

Figure 2:
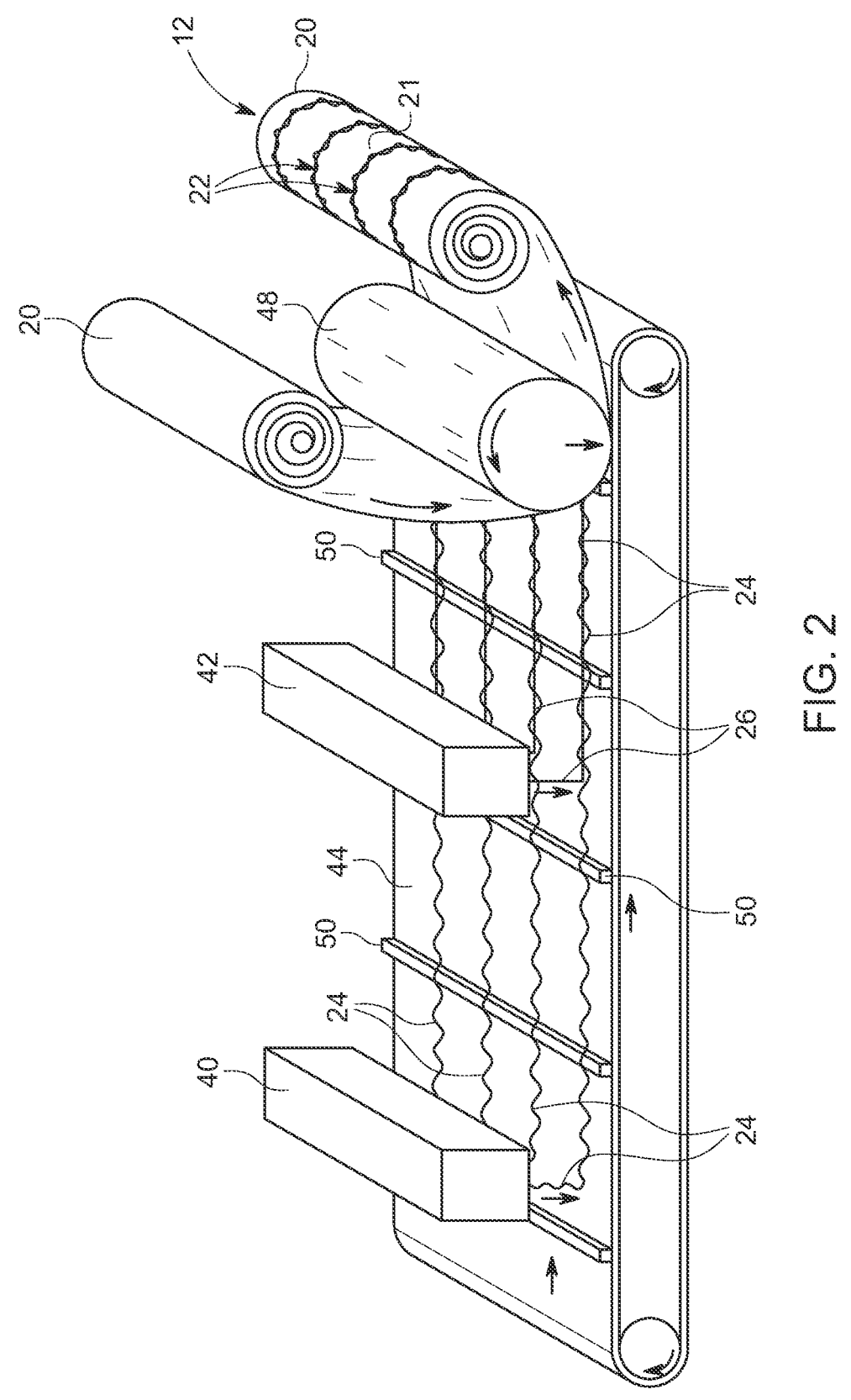
FIG. 2 is a perspective view of an exemplary apparatus showing an exemplary method of fabricating the drainable house wrap in FIG. 1.
Figure 3:
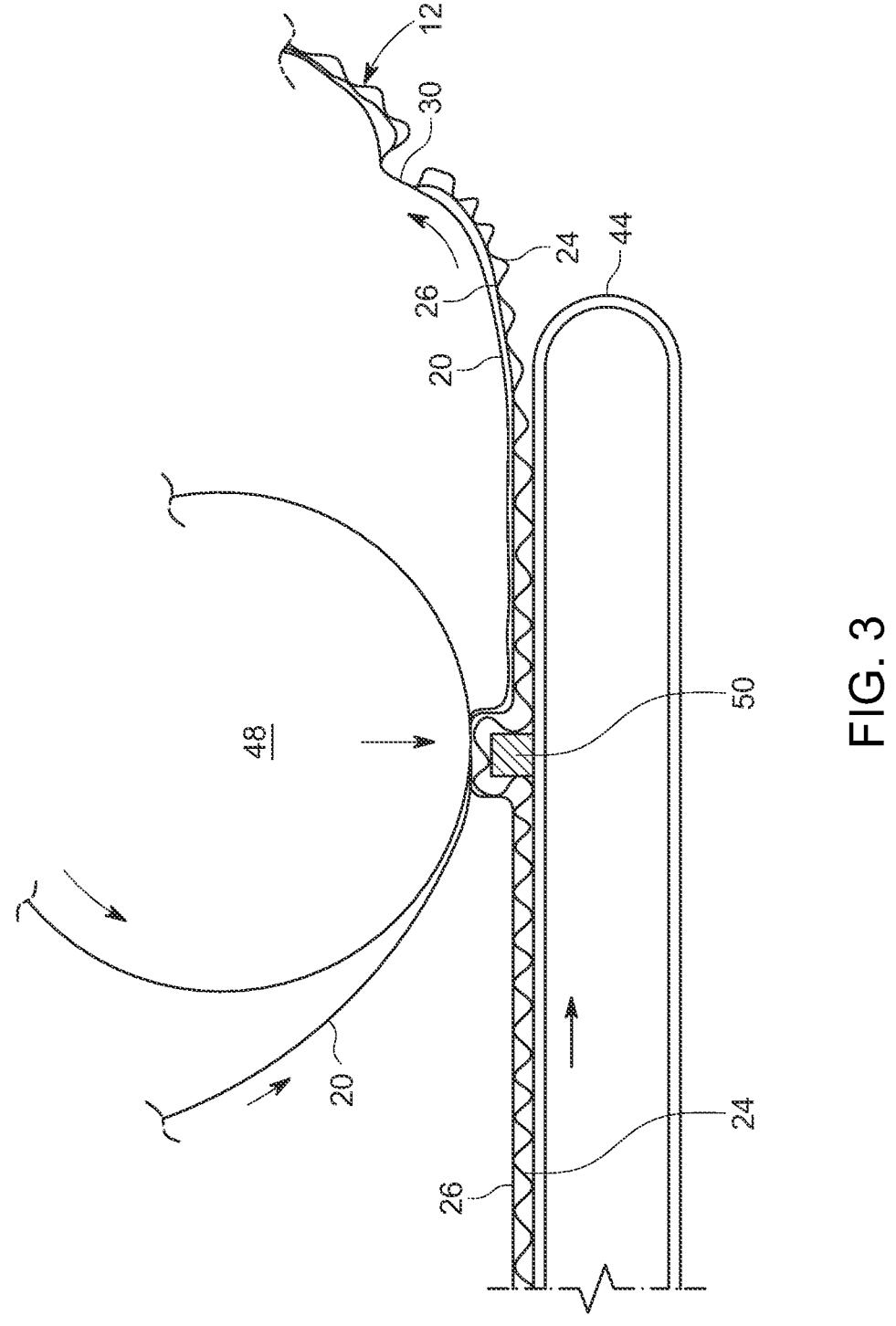
FIG. 3 is an enlarged side view of a roller section of the apparatus and process in FIG. 2.

Turning to FIGS. 2 and 3, an exemplary apparatus and method of forming the house wrap 12 is shown. In the illustrated embodiment, the process generally includes extruding first and second sets of continuous molten polymer monofilament strands 24, 26 from respective extruders 40, 42 onto a profiled belt 44 to form the spacers 22 of the house wrap 12. As shown, each strand 24 in the set from the first extruder 40 is aligned with corresponding second strands 26 in the second set from the second extruder 42, such that the second strands 26 are deposited onto the first strands 24. The polymer material of the first strands 24 is soft and generally flowable when the second strands 26 are deposited thereatop, which enables the strands 24, 26 to self-bond or fuse to each other at their overlapping points of intersection without a bonding agent. The belt 44 may be heated to facilitate the softened state of the strands 24, 26 to promote self-bonding. Although shown with two extruders 40, 42 it is possible that only one extruder with multiple sets of nozzles also could be used.

As discussed above, the first strand 24 of each spacer 22 may travel laterally back and forth as it traverses vertically along the sheet. This may be accomplished in the exemplary process by setting the extrusion velocity of the strand 24 to a value greater than the linear velocity of the belt 44. As such, when the higher velocity (softened) strand 24 hits the slower moving belt 44, the strand 24 will loop back and forth creating the lateral traversal of this part of the spacer 22. An alternative manner of forming the lateral back-and-forth traversal of the first strands 24 is via the extruder 40 (or nozzles thereof) moving laterally back and forth relative to the belt 44; although using differential velocity as noted above is a simpler approach with less costly equipment. Also as discussed above, the second strands 26 may be essentially straight or linear in a vertical direction of the sheet 20, which may be accomplished in the illustrated embodiment by setting the extrusion velocity of the strands 26 about equal to the linear velocity of the belt 44. Alternatively, if it were desired to stretch the strands 26, the extrusion velocity of the strands 26 could be set to a value less than that of the belt 44.

Downstream of the second extruder 42, the weather-resistant sheet 20 is coupled to the strands 24, 26 via a roller 48. As shown, the weather-resistant sheet 20 may be on a spool and is fed between the belt 44 and roller 48 whereupon the strands 24, 26 (still softened) will contact the sheet 20. The roller 48 may apply pressure, or may set a distance to the belt 44 to maintain a raised thickness of the overlapping strands 24, 26 and thus a thickness of the spacers 22 when the strands 24, 26 cool (as shown in FIG. 3, for example).

Figure 8:
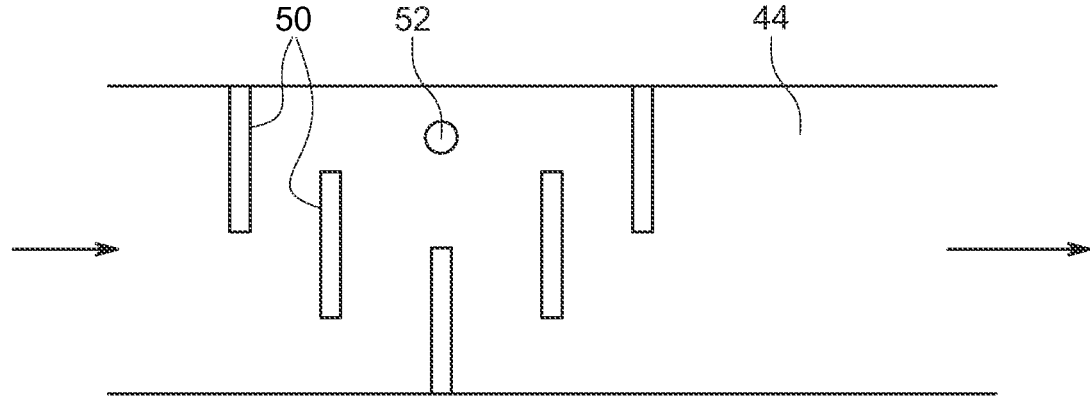
FIG. 8 is a plan view of another exemplary belt profile for use in the apparatus shown in FIG. 2.
Figure 9:
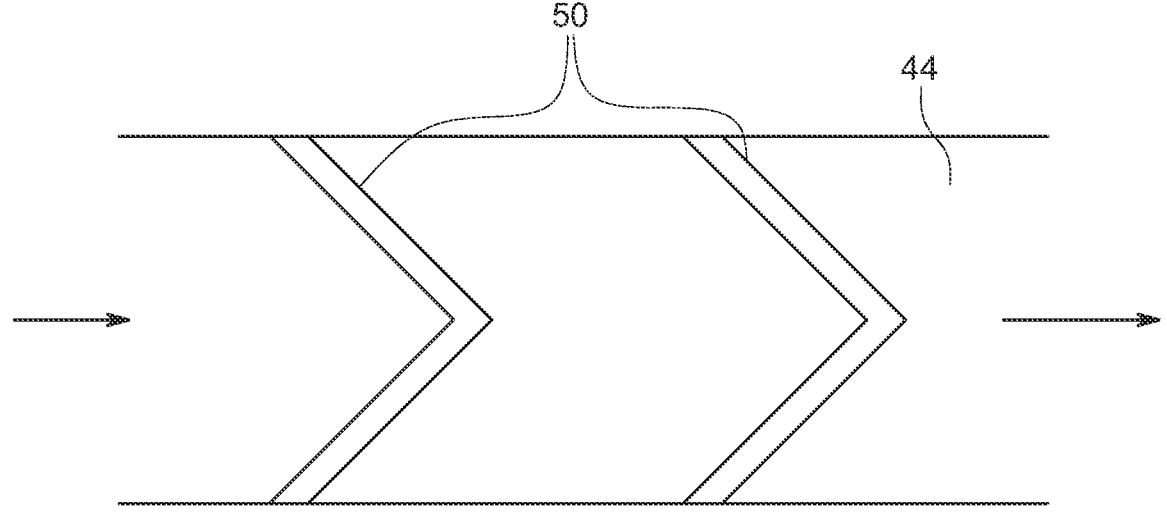
FIG. 9 is a plan view of another exemplary belt profile for use in the apparatus shown in FIG. 2.

As discussed above, the spacers 22 formed by the overlapping strands 24, 26 may be coupled to the sheet 20 at bonding regions that also form the transvers airflow channels 30. This is accomplished in the illustrated embodiment by virtue of the profiled belt 44 having raised bars 50 over which the strands 24, 26 are deposited and which enable compression of the strands 24, 26 at the regions between the roller 48 and bars 50 (as shown in FIG. 3, for example). The strands 24, 26 still are softened in this state and the thermal compression permanently sets the reduced thickness of the strands 24, 26 in these regions to bond to the sheet 20 and also form the transverse airflow channels 30. The profile of the bars 50, and thus the airflow channels 30, may have any suitable configuration, including aligned (as shown in FIG. 3), offset (as shown in FIG. 8), angled (as shown in FIG. 9), or the like. The profiled belt 44 also may include features for providing identification markers to the house wrap 12 for identifying locations for the fasteners 32 to attach the wrap 12 to the sheathing 16. As shown in FIG. 8, for example, button features 52 may be profiled into the belt 44 to apply such identifiers within the strands 24, 26, for example.

After the spacers 22 formed by the strands 24, 26 are coupled to the weather-resistant sheet via the roller 48, the house wrap 12 is formed and may be rolled onto a spool.

Figures 4, 5:
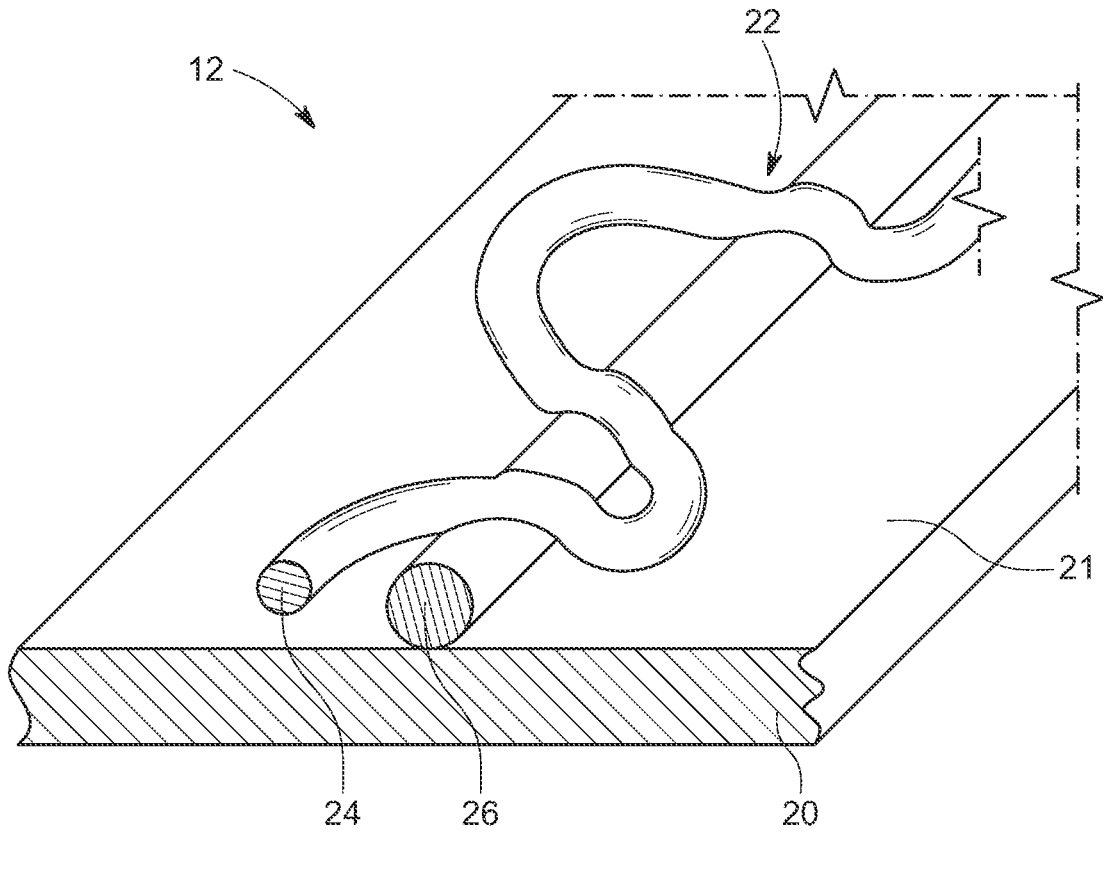
FIG. 4 is an enlarged perspective view of a portion of the drainable house wrap in FIG. 1 showing overlapping strands forming a spacer on a weather-resistant sheet.
FIG. 5 is a side view of the portion of the house wrap shown in FIG. 4.
Figure 6:
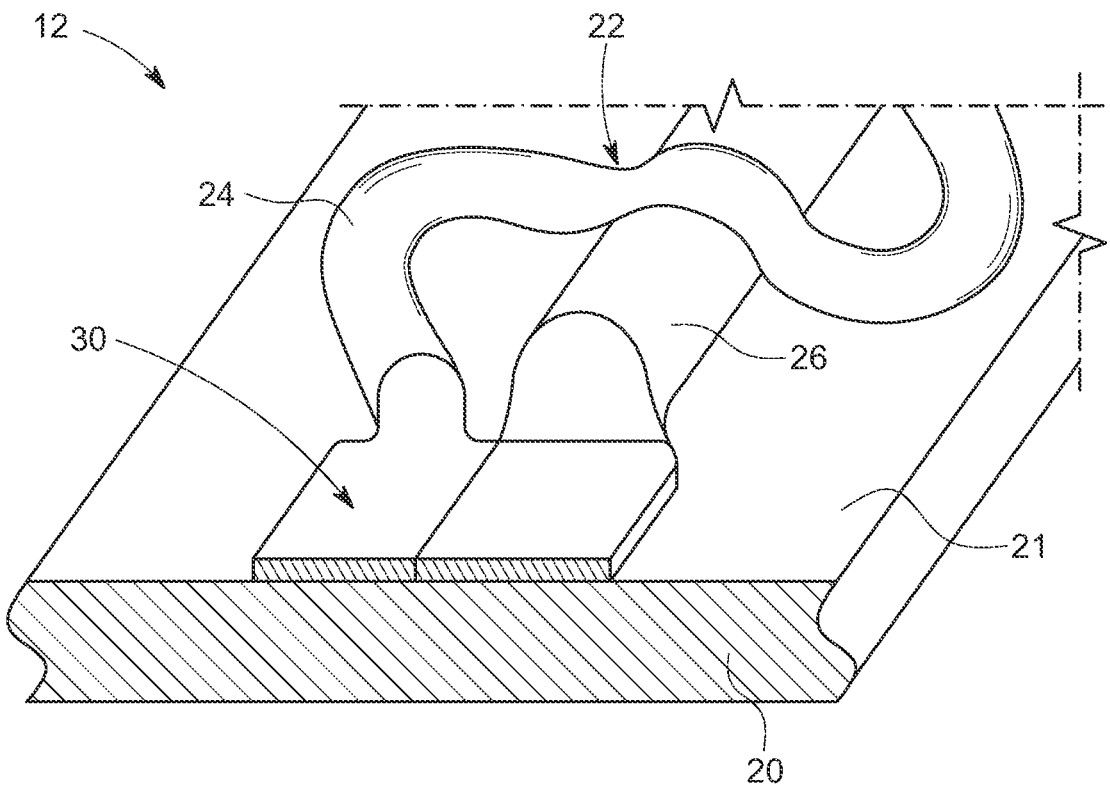
FIG. 6 is an enlarged perspective view of a portion of the drainable house wrap in FIG. 1 showing a compressed section of strands forming a bonding region to the weather-resistant sheet and an airflow channel transverse to the spacer formed by the overlapping strands.
Figure 7:
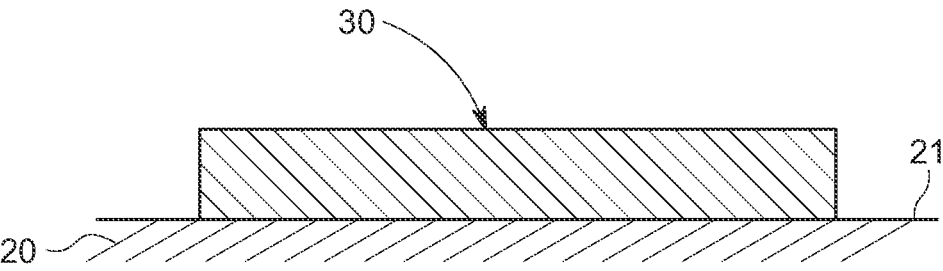
FIG. 7 is a side view of the portion of the house wrap shown in FIG. 6.

FIGS. 4 and 5 show enlarged views of the overlapping strands 24, 26 forming a section of spacer 22 on the weather-resistant sheet 20, and FIGS. 6 and 7 show enlarged views of the compressed region of the strands 24, 26 forming the airflow channel 30 and bonding region to the sheet 20 across a segment of the spacer 22.

An exemplary drainable house wrap 12 and exemplary method for making the same have been described herein. In conjunction with or in addition to the foregoing, the exemplary house wrap 12 provides a drainage control device that provides at least one or more of the following advantages: (1) adhesive line to fasten to sheathing; (2) fastening locations with modified geometry; (3) techniques for butt joint termination; (4) laterally traversing strand (greater lateral extent of width) to create overlap depth of strands; (5) varied strand lateral extent with greater extent front and less lateral extent in back to effectively put the lesser strand on top of the large during fabrication.

It is understood that all ranges and ratio limits disclosed in the specification and claims may be combined in any manner, including all values, ranges and subranges between the stated values. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

As used herein, positional or direction terms such as "upper", "lower", "top", "bottom," "left," "right," "horizontal," "vertical," etc. refer to an exemplary electrical device as viewed in a horizontal position, as shown in FIG. 2H, for example. This is done realizing that these devices can be oriented in various other positions when manufactured, when implemented in other electrical devices, when packaged, and the like.

As used herein, the terms "disposed on," "disposed onto," "deposited onto," "underlying," "overlying," or the like, refers to direct or indirect contact of one element with another element, whereas the term "directly on" or "directly onto" refers to direct contact of one element with another element, but not indirect contact between elements.

It is to be understood that unless specifically stated otherwise, references to "a," "an," and/or "the" may include one or more than one, and that reference to an item in the singular may also include the item in the plural. The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "containing," "involving," "holding," "made of/with," and the like, are to be understood to be open-ended, i.e., to mean including but not limited to, unless otherwise stated.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A drainable house wrap, comprising:
a flexible weather-resistant sheet layer, and
a plurality of raised spacers attached to the weather-resistant sheet layer, wherein the plurality of raised spacers are separated from one another to define at least one drainage flow path between adjacent ones of the plurality of raised spacers;
each of the plurality of raised spacers formed from a first strand and a second strand which partially overlaps the first strand;
each of the raised spacers comprises segments formed along a length thereof, the segments of each raised spacer are spaced apart from one another by transverse air flow channels, the air flow channels provide a direction of air flow between adjacent segments that is crosswise to a direction of the drainage flow path.

2. The drainable house wrap according to claim 1, wherein the airflow channels are formed by compressed regions of the first strands and the second strands.

3. The drainable house wrap according to claim 2, wherein the compressed regions of the strands form bonding regions with the weather-resistant sheet.

4. The drainable house wrap according to claim 2, wherein the first and second strands are press-bonded to the sheet layer with a roller pressing the strands against a raised surface protruding from a belt, and
wherein the compressed regions of the first and second are formed by the raised surface.

5. The drainable house wrap according to claim 4, wherein the raised surface includes bars corresponding to the compressed regions.

6. The drainable house wrap according to claim 4, wherein the compressed regions have a rectangular cross section.

7. The drainable house wrap according to claim 1, wherein the weather-resistant sheet is made with spunbound high-density polyethylene fibers.

8. The drainable house wrap according to claim 1, wherein the house wrap including the sheets and the spacers are rollable with each other.

9. The drainable house wrap according to claim 1, wherein for each of the spacers the first strand overlaps the second strand while extending along a length of the sheet layer.

10. The drainable house wrap according to claim 9, wherein for each of the spacers the first overlaps the second strand in a back-and-forth manner while extending along the length of the sheet layer.

11. The drainable house wrap according to claim 9, wherein the drainage path between the first strands and the second strands follows along a strand-free portion of the sheet layer along the length of the sheet, with the first strands not in contact with the second strands.

12. The drainable house wrap according to claim 1, wherein the first and second strands are thermoplastic monofilaments made from one or more of polyolefin polyamide, polyester or polyvinyl chloride.

13. The drainable house wrap according to claim 1, wherein a thickness (e.g., diameter) of each of the first and second strands is in a range from about 0.125 mm to about 2.0 mm.

14. The drainable house wrap according to claim 1, wherein a thickness of each spacer is in a range from about 0.25 mm to about 5.0 mm.

15. The drainable house wrap according to claim 1, wherein the first and second strands are deposited in a flowable molten state, and are fused to each other at their overlapping points of intersection.

16. The drainable house wrap according to claim 1, wherein the first strands each extend continuously along a length of the first raised spacer; and
wherein the second strands each extend continuously along a length of the second raised spacer.

17. A building assembly comprising:
a cladding, and
the house wrap according to claim 1 abutting the cladding, wherein the raised spacers are on a major surface of the sheet and abut the cladding such that the major surface of the sheet is spaced apart from an opposing major surface of the cladding to form a drainage flow gap that establishes the drainage path.

18. The building assembly according to claim 17, further including sheathing, wherein the house wrap is attached to the sheathing and is disposed between the sheathing and the cladding.

* * * * *